United States Patent
Ferrel et al.

(10) Patent No.: US 6,382,566 B1
(45) Date of Patent: May 7, 2002

(54) METHOD AND APPARATUS FOR DETECTING SKEW AND ASYMMETRY OF AN AIRPLANE FLAP

(75) Inventors: Earl K. Ferrel, Port Orchard, WA (US); Richard P. Klingele, Hiawatha, IA (US); Wolfram Hansis, Kirkland, WA (US); William B. Betters, Moon Township, PA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/471,987

(22) Filed: Dec. 23, 1999

Related U.S. Application Data

(60) Provisional application No. 60/114,207, filed on Dec. 29, 1998.

(51) Int. Cl.[7] ................................................. B64C 3/28
(52) U.S. Cl. ...................................................... 244/215
(58) Field of Search ................................. 244/213, 214, 244/215; 340/945; 324/207.13

(56) References Cited

U.S. PATENT DOCUMENTS

| | | | |
|---|---|---|---|
| 3,598,999 A | 8/1971 | Hofmeister | 250/204 |
| 3,841,589 A | 10/1974 | Appleby et al. | 244/77 |
| 3,935,754 A | 2/1976 | Comollo | 74/665 |
| 3,977,917 A | 8/1976 | Fujimura et al. | 148/31.57 |
| 4,181,276 A | 1/1980 | Kogure et al. | 244/215 |
| 4,256,277 A | 3/1981 | Embree | 244/213 |
| 4,260,121 A | 4/1981 | Baston et al. | 244/213 |
| 4,521,060 A | 6/1985 | Linton | 303/71 |
| 4,789,119 A | 12/1988 | Bellego et al. | 244/226 |
| 5,477,210 A | 12/1995 | Belcher | 340/573 |
| 5,628,477 A | 5/1997 | Caferro et al. | 244/214 |
| 5,680,124 A | 10/1997 | Bedell et al. | 340/945 |
| 5,686,907 A | 11/1997 | Bedell et al. | 340/945 |
| 5,719,566 A | * 2/1998 | Readman et al. | 244/213 X |

OTHER PUBLICATIONS

"Proximity Sensing Components & Systems For Flight Controls", CRANE ELDEC COPORATION, Lynnwood, Washington.

* cited by examiner

*Primary Examiner*—Robert P. Swiatek
(74) *Attorney, Agent, or Firm*—Ann K. Galbraith

(57) ABSTRACT

A system to accurately detect skewing of high lift devices. In one embodiment, the invention provides a system to sense the position of the inboard and outboard ends of each flap. This system preferably detects development of a skewed condition and shuts down the flap drive system before unacceptable aerodynamic or structural conditions occur. In one embodiment, a commercial aircraft has two trailing edge flaps on each wing. Each of the four flaps on the airplane is driven by two ballscrews, one near the outboard end and one near the inboard end of each flap. All ballscrews on all flaps are driven synchronously by a mechanical drive system. By comparing the revolutions of the ballscrews, the differential ballscrew travel can be determined. This differential is a direct measure of flap skew.

6 Claims, 9 Drawing Sheets

METHOD AND APPARATUS FOR DETECTING SKEW AND ASYMMETRY OF AN AIRPLANE FLAP

CROSS-REFERENCE TO RELATED APPLICATIONS

This application claims priority from provisional application No. 60/114,207, filed Dec. 29, 1998.

FIELD OF THE INVENTION

This invention generally relates to a system and apparatus for detecting and signaling the presence of an undesired misalignment of one or more of several aligned elements, and more particularly, to a system for monitoring the alignment of a series of adjacent slats or flaps on an aircraft wing.

BACKGROUND OF THE INVENTION

High lift devices for commercial aircraft wings are sometimes referred to as auxiliary airfoils. Such devices or airfoils are extended from the leading or trailing edges of the wing to increase aerodynamic lift during takeoff and landing of the aircraft. When extended from the wing, the high lift devices increase the effective size, curvature, camber and area of the wing, thereby increasing the lift of the wing for slow speed flight. High lift devices extending from the leading edge of the wing on most airplanes are usually known as slats and those extending from the trailing edge of the wing are known as flaps.

Normally, each high lift device is deployed by two separate but coordinated drive mechanisms, one on the inboard side and the other on the outboard side of the high lift device. Should one of these mechanisms be unable to perform its function, a skewing of the high lift device may occur and jamming or loss of the high lift device may result.

The majority of modern airplane high lift drive systems use actuation methods where all flap drive system elements are driven in synchronization. An element losing synchronization with the rest of the system may cause a skewed flap, that is, a high lift flight control surface that is in an asymmetrical position with respect to the wing's fixed structure. Undetected skewed flaps are a cause for concern due to the possibility of unpredictable airplane handling characteristics. A skewed flap generates more or less lift than a normally positioned flap, causing asymmetric lift between the two wing surfaces. If the asymmetry is too great, the handling characteristics of the airplane may suffer. If the skew exceeds what the structural capability of the flap can withstand, the flap may sustain structural damage or may undergo structural failure and depart from the airplane structure. A departed flap may negatively impact the aircraft's handling and controllability, causing undesirable aerodynamic conditions. Also, a departing flap may cause collateral damage to other parts of the airplane if it strikes another part of the airplane.

Recent airplane certification requirements have reacted to this concern by mandating the incorporation of flap skew detection systems in new airplane designs. A problem in designing such a system is that it must be sensitive enough to detect failures before they become a problem while not generating nuisance warnings or shut-downs because of the relatively small skewing movements caused by normal structural deflections, vibrations, dynamics of the aircraft and temperature changes that would not adversely affect airplane handling characteristics. One example of a known flap skew detection method is illustrated in U.S. Pat. No. 5,680,124. In this method, a detector detects the movement of the flap as a target on the flap moves past the sensor. However, the targets must be of a size large enough to be detected by the sensor at a specified distance. Depending on the target's distance from the sensor and the relative size of the flap stroke, the preciseness of the skew detection may be less than desirable for certain applications. This may lead to an excessive number of false skew alarms or too few alarms, depending on the alarm parameters set for the system.

SUMMARY OF THE INVENTION

Figure 1:
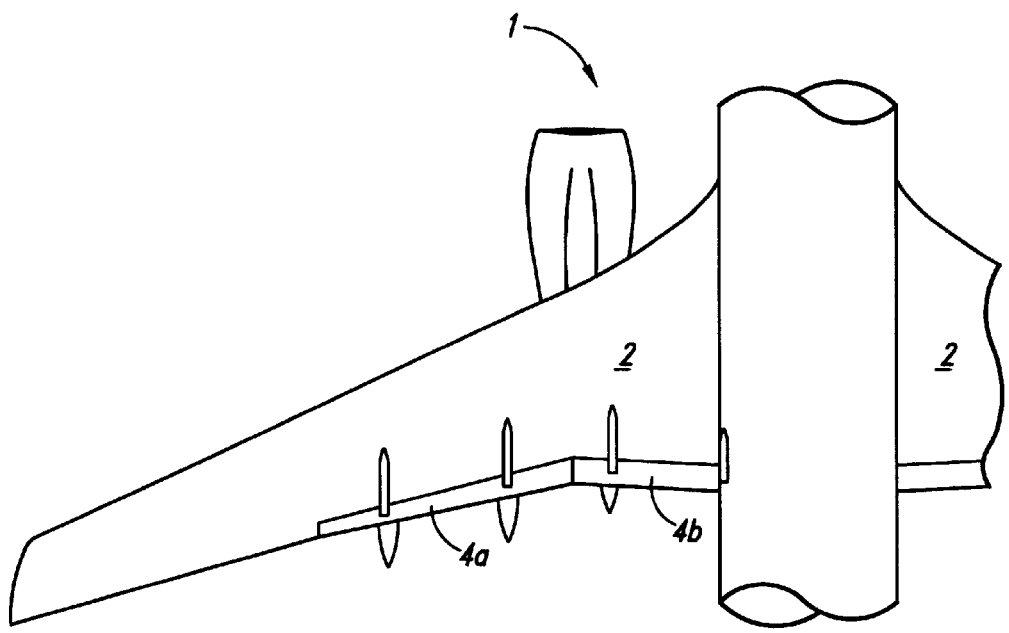
FIG. 1 is a plan view from above an aircraft showing the location of the flaps and flap tracks on the left wing; right wing is symmetrical.

In one aspect, this invention is an apparatus for detecting and signaling a misalignment of a retractable auxiliary airfoil attached to an aircraft wing and driven by at least two rotating drive mechanisms, one of which has an inboard position relative to the other, comprising: (a) at least one magnetic target array mounted on each of the inboard and outboard drive mechanisms, such that each array rotates as the rotating drive mechanisms rotate; (b) at least two inductive proximity sensors, each mounted on the wing in a position relative to one of the target arrays to sense and generate an output signal indicative of the degree of rotation of the target array; and (c) means for receiving output signals from the sensors as the rotating drive mechanisms move the airfoil, calculating the difference between the degree of rotation of the drive mechanisms, and generating an output signal when the difference exceeds a predetermined number.

In another aspect, this invention is an apparatus for detecting and signaling the position of a retractable auxiliary airfoil attached to an aircraft wing and driven by at least one rotating drive mechanism, comprising: (a) at least one magnetic target array mounted on the rotating drive mechanism, such that it rotates as the drive mechanism rotates; (b) at least one inductive proximity sensor mounted on the wing in a position relative to the target array to sense and generate an output signal indicative of the degree of rotation of the target array; and (c) means for receiving output signals from the sensor, calculating the position of the airfoil based on the degree of rotation, and generating an output signal that indicates the position of the airfoil.

The invention provides a system to accurately detect skewing or failure of airfoils, particularly high lift devices.

In one embodiment, the invention provides a system to sense the position of the inboard and outboard ends of each airfoil. This system preferably detects development of a skewed condition and shuts down the airfoil drive system before unacceptable aerodynamic or structural stress conditions occur.

In one embodiment, a commercial aircraft has two trailing edge flaps on each wing. Each of the four flaps on the airplane is driven by two ballscrews, one near the outboard end and one near the inboard end of each flap. All ballscrews on all flaps are driven synchronously by a mechanical drive system. By comparing the revolutions of the ballscrews, the differential ballscrew travel can be determined. This differential is a direct measure of flap skew.

The invention provides an accurate and compact flap skew detection system that operates independently of the flap drive system. It can be made in a sufficiently compact manner so as to fit within fairings already present on the airplane, and made with sufficient sensitivity to meet aircraft certification requirements.

The invention provides a flap skew detection system that is low cost, can be easily retrofitted to existing aircraft structures, easy to maintain, reliable and resistant to environmental effects.

DESCRIPTION OF THE PREFERRED EMBODIMENT

The term "rotating drive mechanism" as used herein means an assembly that drives the airfoil directly, or indirectly through other components or mechanisms, by rotating in place. Preferably, the mechanism is a screw drive mechanism, which is a screw and nut assembly that is configured to translate rotary motion applied to the screw to linear motion of the nut. The nut is attached to the airfoil in a manner such that movement of the nut causes the airfoil to extend in a direction away from the wing or retract towards the wing, depending on the direction of the screw rotation. Any suitable screw drive mechanism may be utilized, but the mechanism is preferably a ballscrew assembly. "Retractable auxiliary airfoil" as used herein means an airfoil attached to the wing that is movable in relation to the fixed portion of the wing.

Examples of such include movable flats, and slats. Preferably, the airfoil is a trailing edge flap.

Figure 2:
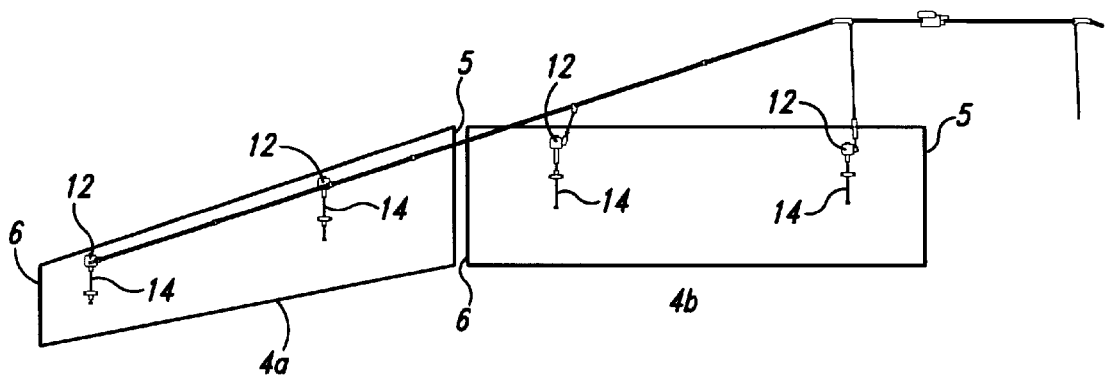
FIG. 2 is a schematic view of an embodiment of a trailing edge flap drive layout.

With reference to FIGS. 1 and 2, an aircraft embodiment 1 has wings 2, each provided with high lift devices in the form of an outboard and an inboard trailing edge flap 4a, 4b, respectively. As seen in FIG. 2, each flap 4a, 4b, is driven by a pair of ballscrews 14, one near the inboard edge 5 and one near the outboard edge 6 of each flap.

Figure 3:
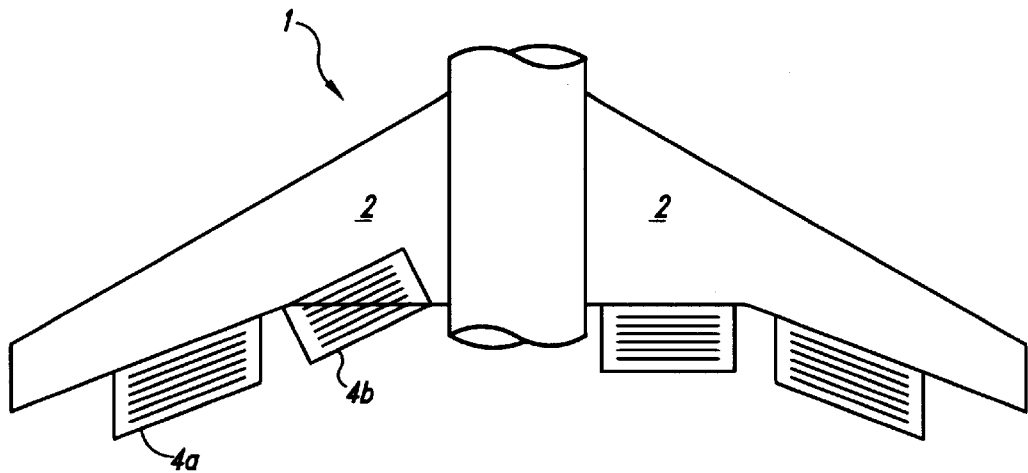
FIG. 3 is a highly schematic illustration of trailing edge flaps with a skewed inboard flap.

FIG. 3 is a schematic representation, with dimensions not to scale, of a flap skew. A skew condition is one where a flap (for example, 4b in the FIG. 3 illustration) is in a position that is asymmetric with respect to the wing's fixed structure.

Figure 4:
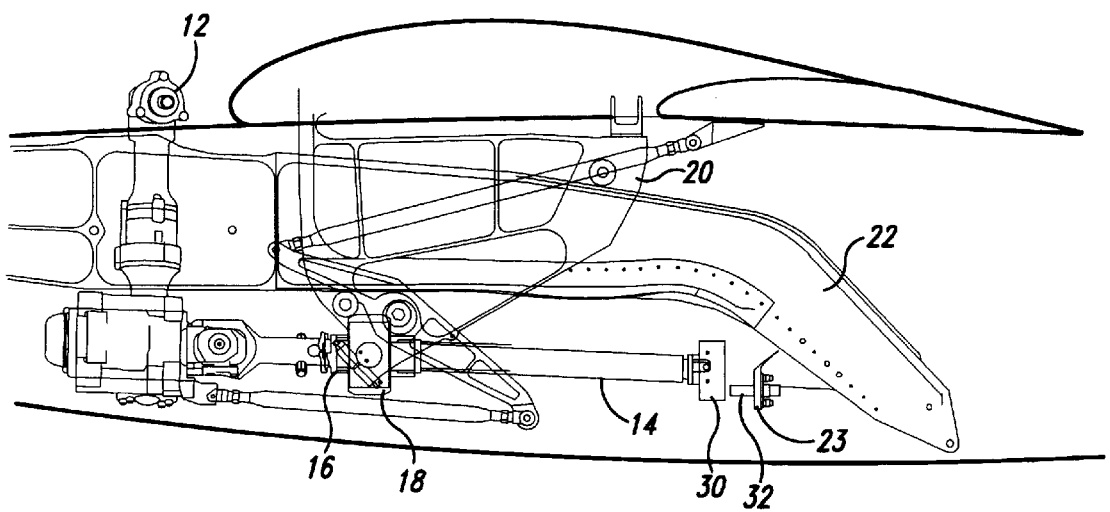
FIG. 4 is a detailed cross-sectional view of one of the eight trailing edge flap actuation and support installations of a preferred embodiment with flaps in the retracted position.
Figure 6:
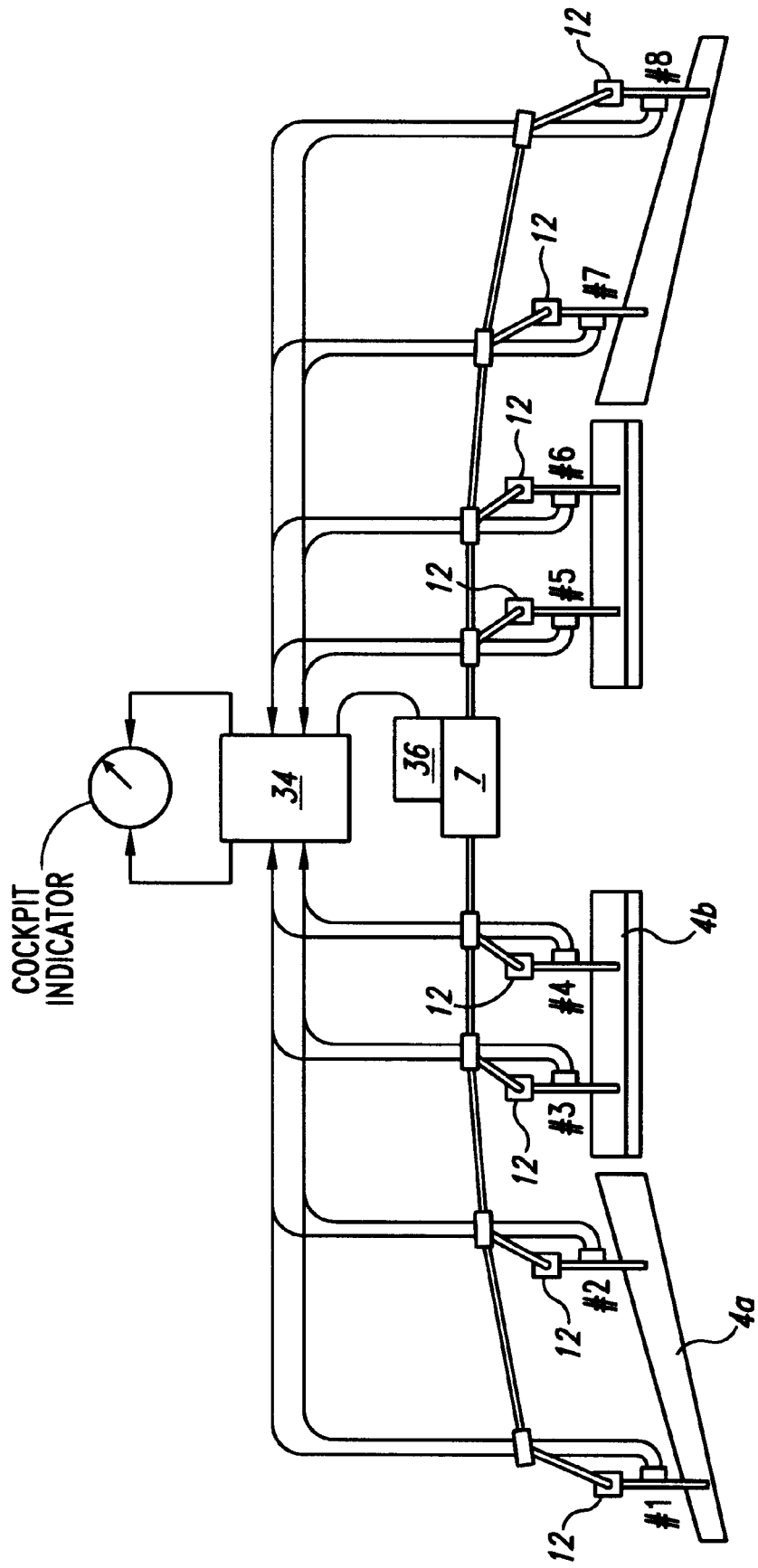
FIG. 6 is a schematic of the flap skew detection and shutdown system of a preferred embodiment.

With reference to FIGS. 2, 4 and 6, during normal operations in the illustrated embodiment, the pilot commands flap position via a flap lever in the cockpit. The flap lever position commands a power drive unit 7 to extend or retract flaps 4a, 4b. A control valve on the power drive unit ports hydraulic fluid to a motor which, via a gearbox, rotates shafts along the wing trailing edge (in the illustrated embodiment) to eight transmissions 12 (two per flap). Each transmission 12 powers a ballscrew 14. As the ballscrew 14 rotates, the ballnut 16 translates along the ballscrew 14. A gimbal 18 supports the ballnut 16 on the flap carriage 20, and thus causes the flap carriage 20 to move with the ballnut 16.

Each carriage 20 is supported by a flap track 22, which is attached to the wing 2. Two carriages 20 support each flap. As the carriages 20 move along the flap track 22, the flap extends or retracts in accordance with the pilot's command.

Figure 8:
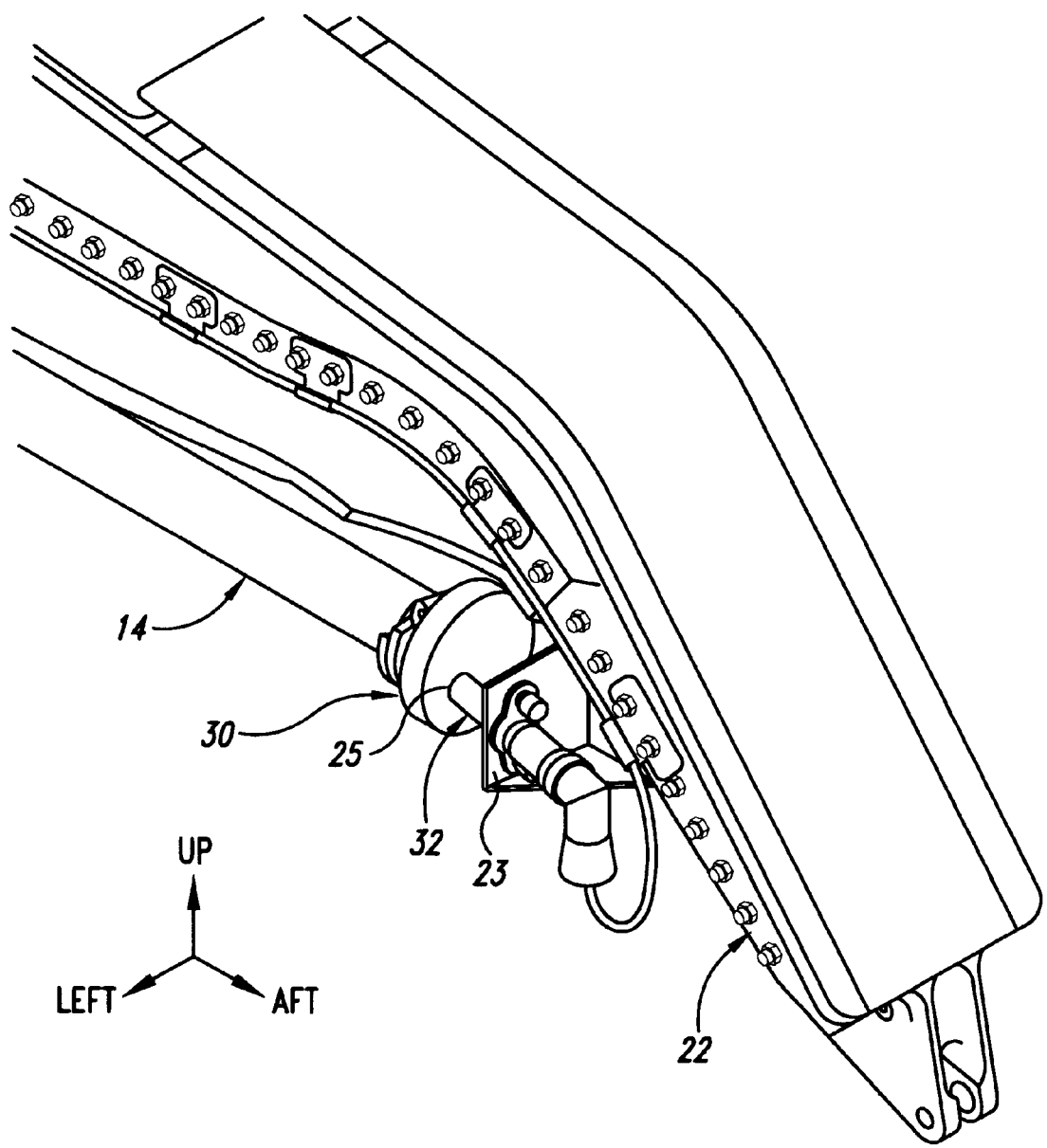
FIG. 8 is a perspective view of a target array and sensor installed on a ballscrew and flap track according to a preferred embodiment.

Referring now to FIGS. 4 and 8, in a preferred embodiment, a skew sensing apparatus includes a target array 30 mounted on the ballscrew shaft 14, a sensor 32 (mounted to a fixed wing structure such as the flap track 22) which senses movement of the target array, and an electronics unit 34 which receives and processes inputs from the sensors 32. The electronics unit provides a means for receiving output signals from the sensors as the rotating drive mechanisms move the airfoil, calculating the difference in the degree of rotation of the rotating drive mechanisms, and generating an output signal when the difference exceeds a predetermined number, and/or a means for receiving output signals from the sensor, calculating the position of the airfoil based on the degree of rotation, and generating an output signal that indicates the position of the airfoil. The terms "means for receiving output signals from the sensors as the rotating drive mechanisms move the airfoil, calculating the difference in the degree of rotation of the rotating drive mechanisms, and generating an output signal when the difference exceeds a predetermined number" and "means for receiving output signals from the sensor, calculating the position of the airfoil based on the degree of rotation, and generating an output signal that indicates the position of the airfoil" as used herein refer to any suitable electronic device capable of performing these functions. An example of such means includes a Boeingυ flap/slat accessory module. The output signal of the device may be utilized for enhancement of aircraft operation in any suitable manner, such as by providing input to displays or alarms on the flight deck or by automatically shutting down operation of the airfoil rotating drive mechanisms to prevent asymmetric lift or structural damage to the aircraft.

Any suitable inductive proximity sensor may be utilized in the apparatus of the invention. In a preferred embodiment, the sensor 32 is one which contains an electrical coil whose impedance changes in a measurable way when the sensor head is adjacent a magnetic field, such as that sold by the ELDEC Corporation, a division of Crane Co., under the trademark SCORE™. The sensor 32 is preferably mounted on the aft end of the associated fixed flap track 22 by means of a bracket 23. The sensor head is oriented substantially perpendicular to the target array surface, which may be perpendicular or parallel to the ballscrew's axis, or at any angle therebetween.

Figure 5:
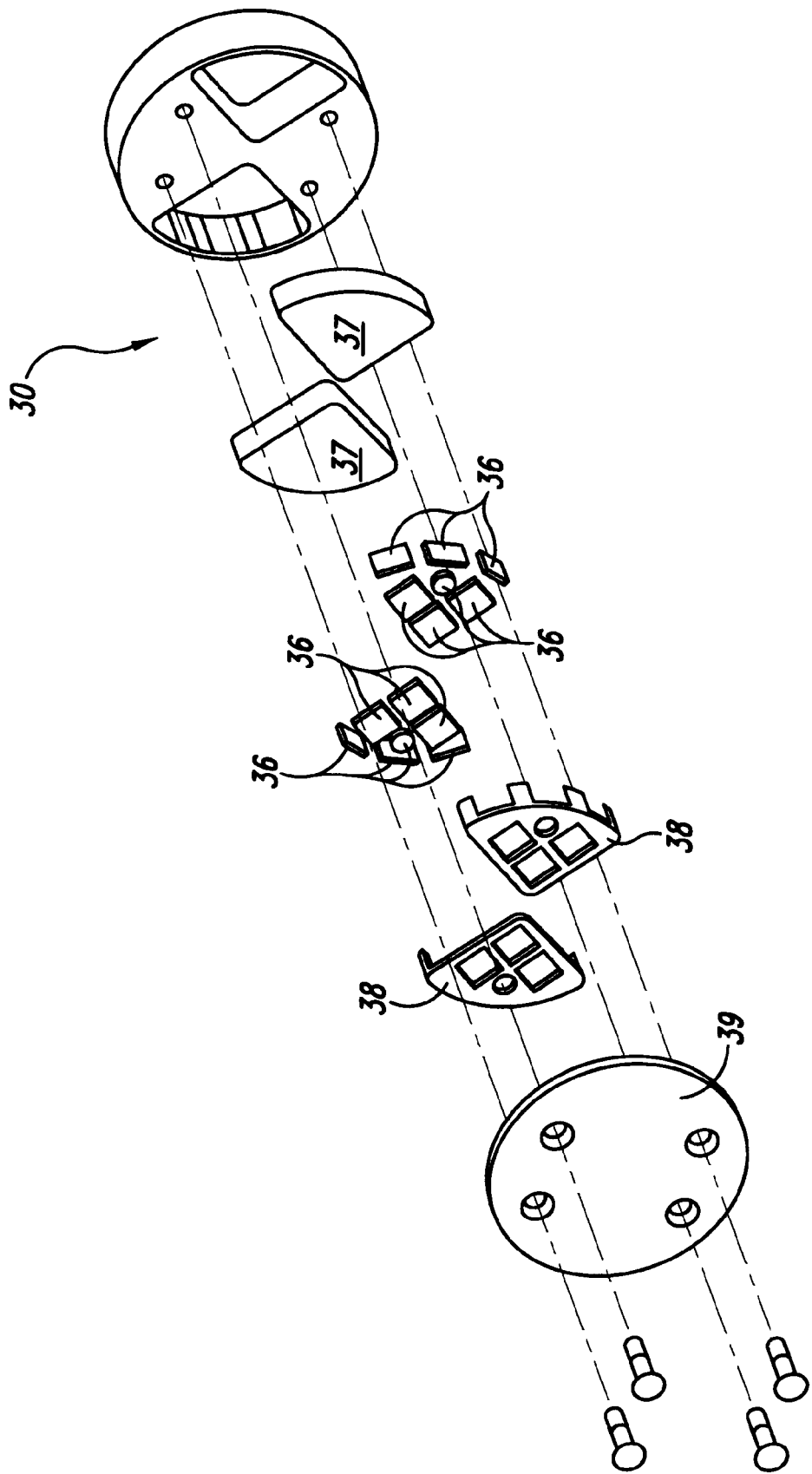
FIG. 5 is an exploded view of a target array of a preferred embodiment.

The target array 30, shown in an exploded view in FIG. 5, is generally disc-shaped. It preferably includes at least two pie shaped permanent magnet fields evenly spaced on a non-magnetic disc. Pie-shaped fields provide optimally sized magnetic fields over a range of variations in the location of the target with respect to the sensor by balancing target far and target near sizes.

The pie shaped target fields are preferably formed by using samarium cobalt permanent magnets 36 affixed to a pair of pie-shaped metal backing plates 37. The metal backing plates 37 enhance and direct the magnetic field. A pair of brackets 38 with apertures which accommodate the magnets 36, hold the magnets 36 in formation on the backing plates and in the pockets of the housing to produce a pair of pie-shaped fields. A cover plate 39 is installed over the brackets 38. In the embodiment illustrated, the magnetic field is required to extend beyond the periphery of the part in both the axial and radial directions, for reasons discussed below. The target array 30 is installed in an orientation such that the field generated by the targets is directed toward the sensor head 32.

As illustrated in FIG. 8, a sensor 32 is installed near each trailing edge ballscrew drive, mounted on a bracket extending from the flap track 22, and a target array 30 is mounted on the ballscrew shaft 14 for rotation therewith. When the flaps are commanded to extend or retract, the ballscrew 14 and the attached target array 30 rotate. The magnetic fields on the rotating target array 30 cause a change in impedance of the sensor 32 mounted adjacent to the target array 30, every time a magnetic field passes by the sensor 32. When the magnetic field is adjacent to the sensor 32, the sensor impedance is high ("target near" condition). When the magnetic field is away from the sensor 32, the sensor impedance is low ("target far" condition).

A Flap/Slat Accessory Module (FSAM) 34 (see FIG. 6) contains sensor electronics (demodulator) and the electronics and software to process the sensor signals. The FSAM contains the electronic processing and controls which reads the sensor outputs and counts the number of times a magnetic field passes the sensor 32 and thus determines the number of ballscrew revolutions. The FSAM 34 compares the rotation of corresponding ballscrews, and if the rotation of a ballscrew differs by more than a predetermined number of revolutions from that of its pair, the FSAM 34 provides a flight deck indication and shuts down the flap drive system before an unacceptable level of skew can occur.

In a preferred embodiment, relative motion is computed by comparing the number of revolutions of the inboard and outboard ballscrews for a given flap (i.e., using the numbering scheme of FIG. 6, comparing #1 to #2, #3 to #4, #5 to #6, and #7 to #8). However, alternative embodiments can have the FSAM 34 compare outputs of sensors which are symmetric about the center line of the airplane (for example, compare #1 to #8, #2 to #7, #3 to #6, and #4 to #5), or their relatives (for example, compare #1 to #7, #2 to #8, #3 to #5, and #4 to #6). Multi-comparison between outputs is also possible to help identify the location of the malfunction. Shutdown by the FSAM 34 is through commanding the shut-off valve 36 to the closed position and the trailing edge bypass valve to the bypassed position. Trip thresholds and time delays are preferably sized to prevent the skew from exceeding structural requirements.

Figure 7A:
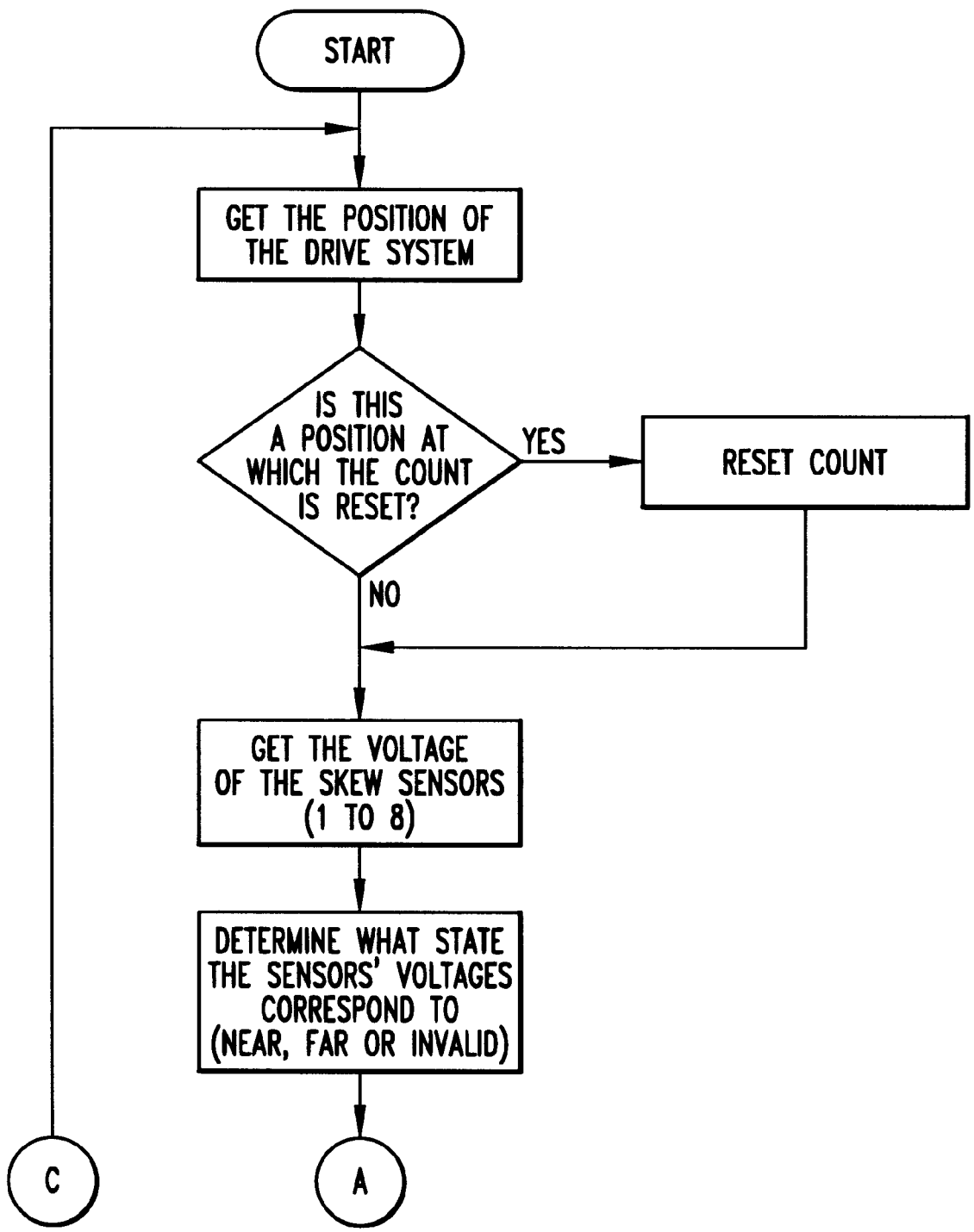
FIGS. 7a, 7b, and 7c show a flow chart of a preferred embodiment of the operational logic for skew detection and shutdown.
Figure 7B:
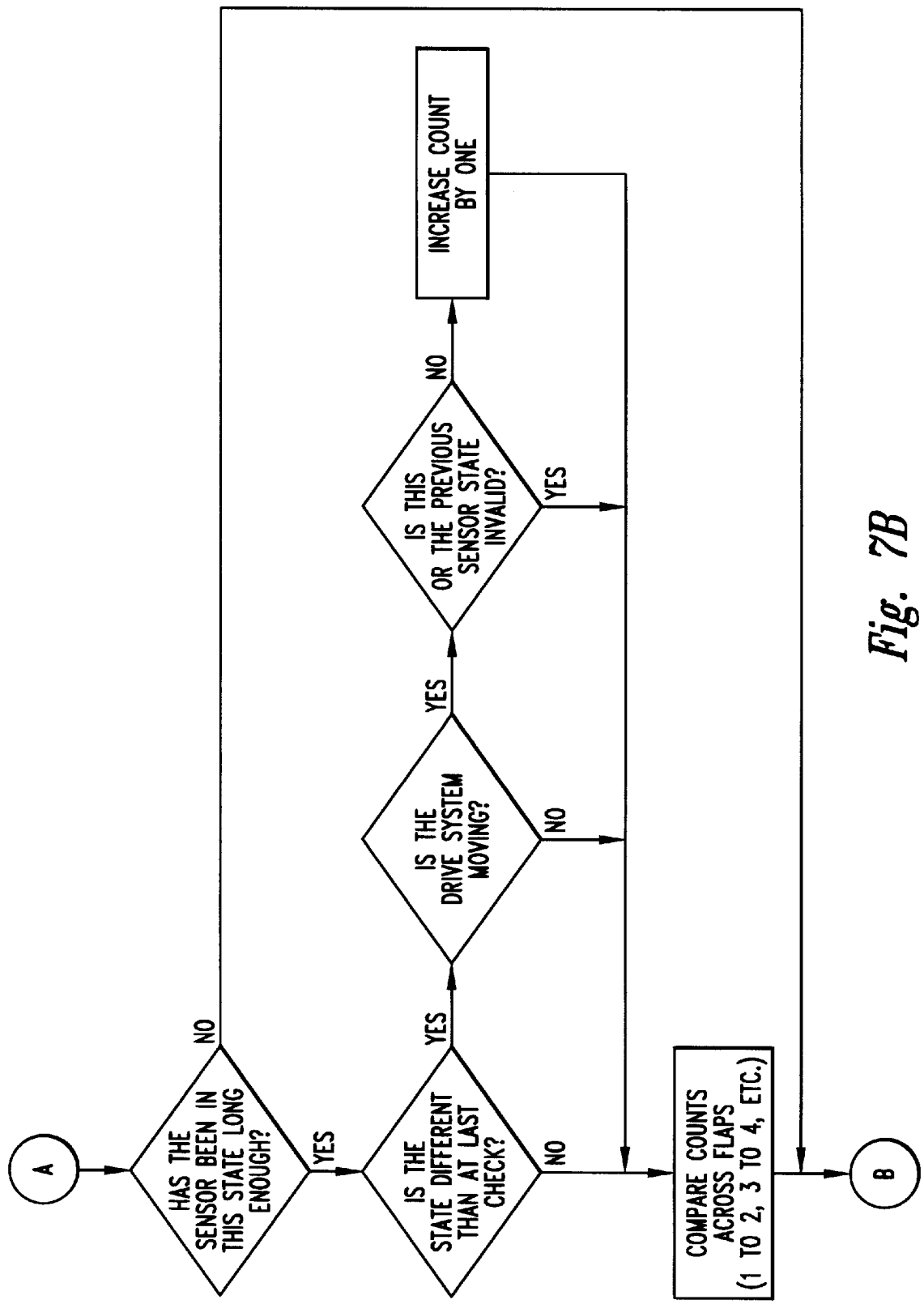
Figure 7C:
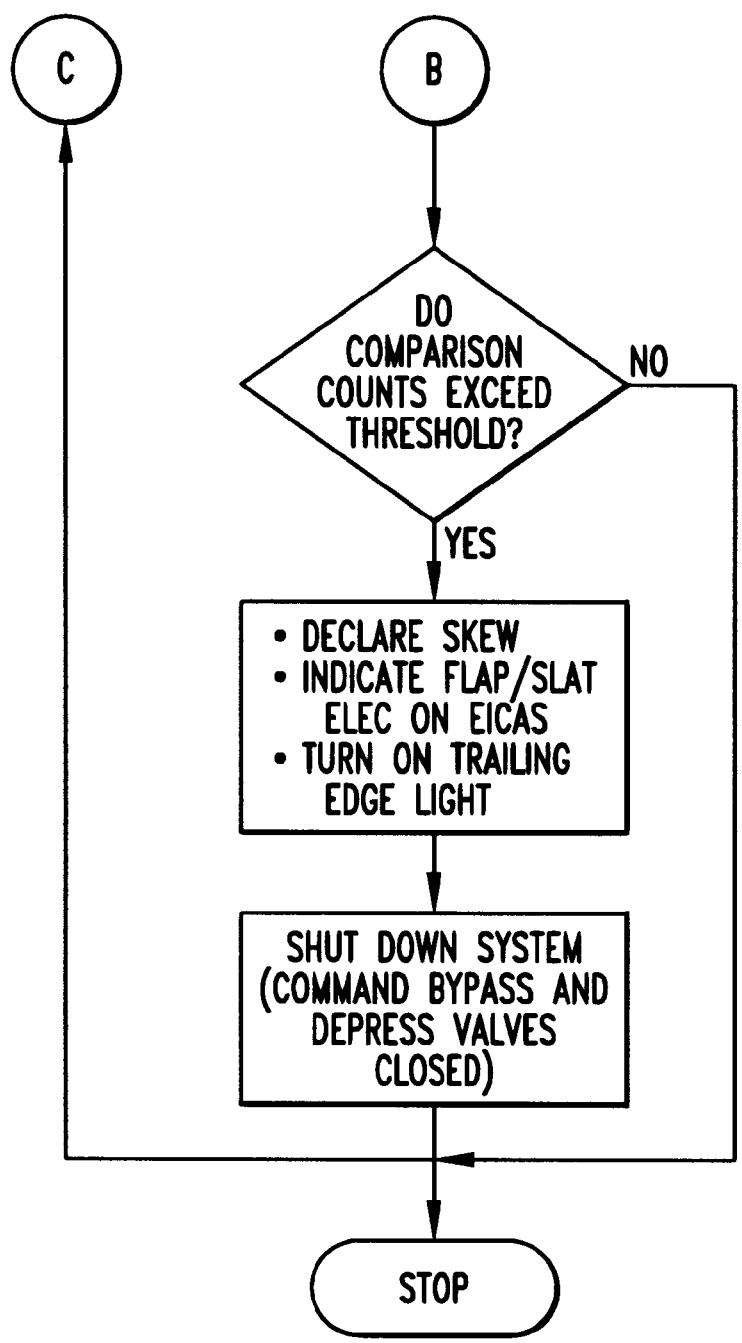

FIG. 7 shows the logic used in the preferred embodiment. Indication of skewed deployment is almost continuously available in primary mode. In alternate mode, protection is only an indication of failure, not a shut-down of the system because skewed deployment in alternate mode requires two failures (one failure that disables normal mode and one failure that causes the skew) and because actuation in alternate mode is slow enough that the pilot can react to the failure. Failed sensors send a signal different from that of target near or target far. This is also detected by the FSAM.

The geometry of the target assembly, the geometry of the system installation and the logic of the FSAM are chosen to provide a sufficient number of zones for accuracy requirements while also providing nuisance protection, and to provide sufficient times in near and far zones. The "maybe" zone is the tolerance band in which the triggering between near and far, as sensed by the FSAM, will occur. Many factors, such as temperature, magnet strength, earth's flux, etc. contribute to this tolerance band. Insufficient conservatism in the estimate would result in a non-functional system and excessive conservatism would violate the space constraints.

The geometry of the target assembly, the geometry of the system installation and the logic of the FSAM are also chosen to provide filtering of dithering. It is highly desirable to discriminate between a change of state due to ballscrew rotation and one due to vibration or the nature of "maybe" zones. Lack of discrimination would cause nuisance shutdowns of the flap drive system.

Geometry and logic choices are also made to provide trip thresholds and time delays for accuracy requirements while also providing nuisance protection. For the illustrated embodiment, a minimum number of counts in the electronics system must be accommodated by the geometry to meet system accuracy requirements.

Figure 9C:
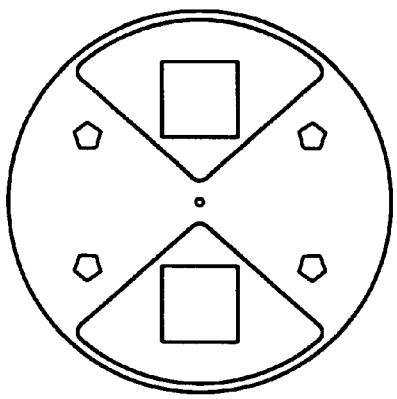
FIG. 9 illustrates several embodiments of a target array.
Figure 9B:
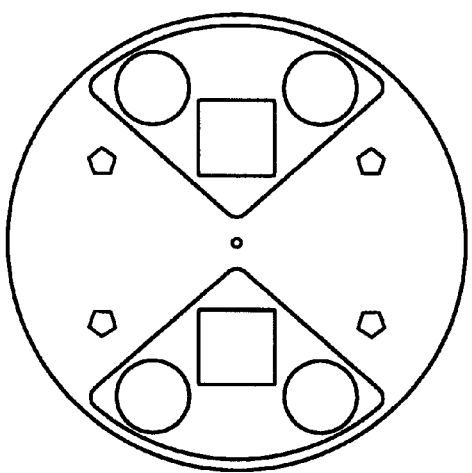
Figure 9A:
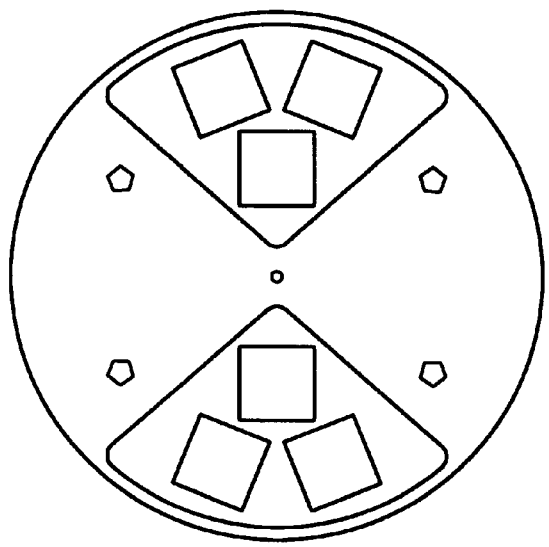

The geometry of the target assembly, the geometry of the system installation and the logic of the FSAM are also chosen to provide proper operation during a combination of rotary and linear movement of the target array relative to the sensor. The time at the target near state and target far state must be sufficient for electronic detection during all operating combinations during which sensing is required. Also, the geometry and logic must be such that the system operates properly through the full range of possible ballscrew locational variation. Tolerances, clearances, vibration, deflections, and kinematics contribute to a significant locational variation between each ballscrew and its track. Unless the sensor is slaved to the target, the magnetic field array must be large enough and shaped properly to compensate for all of the possible movement. For this reason, it is preferable, in the illustrated embodiment, to have the magnetic field extend beyond the periphery of the target array. For example, the magnets may be arranged so that a portion of the magnets on the side of the target facing the inductive sensor have their negative (−) poles pointed towards the sensor while the rest have their positive (+) poles pointed towards the sensor. The magnets may be made of any suitable material, but are preferably comprised of samarium cobalt. Additional embodiments of the target array are shown in FIGS. 9A, 9B, and 9C.

While the invention has been described by way of exemplary embodiments, the claims are not limited to the embodiment described herein. Equivalent devices or steps may be substituted for those described, and operate according to the principles of the present invention and fall within the scope of the claims.

What is claimed is:

1. An apparatus detecting and signaling a misalignment of a retractable auxiliary airfoil, wherein the airfoil is (i) attached to an aircraft wing, and (ii) driven by at least two rotating drive mechanisms, one of which has an inboard position relative to the other, comprising:

at least one magnetic target array mounted on each of the inboard and outboard rotating drive mechanisms, such that each array rotates as the rotating drive mechanisms rotate;

at least two inductive proximity sensors, each mounted on the wing in a position relative to one of the target arrays to sense and generate an output signal indicative of the degree of rotation of the target array; and means for receiving output signals from the sensors as the rotating drive mechanisms move the airfoil, calculating the difference in the degree of rotation of the rotating drive mechanisms, and generating an output signal when the difference exceeds a predetermined number.

2. The apparatus of claim 1 wherein the rotating drive mechanism is a ballscrew assembly.

3. An apparatus detecting and signaling a misalignment of a trailing edge flap of an aircraft wing wherein the flap is driven by at least two rotating drive mechanisms, one of which has an inboard position relative to the other, comprising:

at least one magnetic target array mounted on the inboard and outboard rotating drive mechanisms, such that each array rotates as the rotating drive mechanisms rotate;

at least two inductive proximity sensors, each mounted on the wing in a position relative to one of the target arrays to sense and generate an output signal indicative of the degree of rotation of the target array; and means for receiving output signals from the sensors as the rotating drive mechanisms move the airfoil, calculating the difference in the degree of rotation of the rotating drive mechanisms, and generating an output signal when the difference exceeds a predetermined number.

4. The apparatus of claim 3 wherein the rotating drive mechanism is a ballscrew assembly.

5. An apparatus detecting and signaling the position of a retractable auxiliary airfoil attached to an aircraft wing and driven by at least one rotating drive mechanism, comprising:

at least one magnetic target array mounted on the at least one rotating drive mechanism, such that it rotates as the at least one rotating drive mechanism rotates;

at least one inductive proximity sensor mounted on the wing in a position relative to the at least one target array to sense and generate an output signal indicative of the degree of rotation of the at least one target array; and means for receiving output signals from the at least one sensor, calculating the position of the airfoil based on the degree of rotation, and generating an output signal that indicates the position of the airfoil.

6. The apparatus of claim 5 wherein the at least one rotating drive mechanism is a ballscrew assembly.

* * * * *